Nov. 9, 1965 J. T. BOATWRIGHT 3,217,257

SIGNAL TO NOISE RATIO ENHANCING DEVICE

Filed Oct. 19, 1961

INVENTOR.
JOHN T. BOATWRIGHT

BY Walter J. Kreske
ATTORNEY

United States Patent Office 3,217,257

Patented Nov. 9, 1965

3,217,257

SIGNAL TO NOISE RATIO ENHANCING DEVICE

John T. Boatwright, Waltham, Mass., assignor to General Electronic Laboratories, Inc., Cambridge, Mass., a corporation of Delaware Filed Oct. 19, 1961, Ser. No. 146,288
13 Claims. (Cl. 325—349)

This invention relates to devices utilizing signal tracking limiters to enhance signal-to-noise ratio and more particularly to regenerative diode limiter circuits which track the signal and effectively narrow the noise bandwidth.

In conventional frequency modulation receivers, a substantial part of the noise problem lies in the fact that the signal at any instant appears in only a portion of the bandwidth of the receiver, whereas the noise contribution buildup occurs from the entire bandwidth capability of the receiver. Devices heretofore aimed at improving signal-to-noise ratio have generally operated on the principal of regeneratively building the signal and at the same time reducing the noise power density. Such devices have improved signal-to-noise ratio with moderate degrees of success. However, they still contain the problem of having noise contribution remaining from the entire bandpass capability of the receiver even though a signal at any given moment covers only a fraction of the bandpass spectrum.

This problem has been overcome in the present invention which succeeds in achieving a substantial reduction in effective noise bandwidth by utilizing only a small portion of the bandwidth capability of the receiver, that portion in which the signal exists as of any given moment. The present invention also includes other desirable features and advantages. Among these other features and advantages are that of relative simplicity in construction and reliability in operation and a structure which can be incorporated as an additional arrangement in existing receivers as well as an integral part of new receivers. The present invention may also be adapted to operate in conjunction with noise density suppression devices such as disclosed in my application entitled Frequency Modulation Signal Enhancer, Serial No. 87,422, filed February 6, 1961. Another advantage of the present invention is that it achieves very sharply defined bandpass characteristics. A further advantage is that the desirably sharp bandpass characteristic is achieved with structure which is not a linear passive device such as conventional tank filters, thus the problem of undesired impressing of modulation on the signal by conventional filters is circumvented.

A primary object of the present invention is the achievment of a device capable of effecting a substantial reduction in noise power occuring in the passband of a receiver by eliminating all but the frequency band immediately surrounding the signal at any given instant.

Another object is the provision of a device for enhancing the signal-to-noise ratio by a narrow band tracking arrangement locking on the incoming signal.

And a further object is the provision of a signal enhancing device particularly adapted for operation on the signal emanating from the intermediate frequency amplifier in a receiver.

And a further object is the provision of a signal-to-noise ratio enhancing device which incorporates therein an extremely wide band frequency modulation to amplitude modulation convertor and detector, thereby achieving excellent signal capture characteristics and a high degree of linearity in the operation of the device.

These and other features, objects and advantages are achieved generally by the provision of a diode limiter configuration with self contained regenerative feedback path arranged to receive an incoming intermediate frequency modulation signal, a discriminator for converting the limiter to a detected modulation signal, which is fed back to the limiter for controlling limiter operation.

By providing a variable gain preamplifier driver interposed between the intermediate frequency signal and the diode limiter, an arrangement for effectively isolating the diode limiter from the intermediate frequency amplifier and providing effective control of the diode limiter passband is thereby achieved.

By making the variable gain preamplifier driver in the form of a remote cutoff pentode, a desirably wide range of control is thereby achieved.

By providing zener diodes in the diode limiter configuration, desirably sharp breakpoint and high conduction in the breakdown region with desirably low capacitive characteristics is thereby achieved.

By providing a linear feedback amplifier in the self contained regenerative feed back path of the diode limiter configuration, effective control of the input to the regenerative limiter is thereby achieved by control of the cathode voltage of the linear amplifier.

By making the discriminator in the form of an extremely wideband frequency modulation to amplitude modulation convertor detector, good linearity, good capture ratio and extremely low time delay for enhancing optimum operation of the overall configuration is thereby achieved.

By providing a cathode follower in the control feedback path from the discriminator to the regenerative limiter, a wideband impedance transformation, and effective isolation of the discriminator from the limiter is thereby achieved.

By providing a direct current stabilization circuit between the discriminator output and the feedback amplifier grid in the diode limiter, stabilization of center frequency in the regenerative diode limiter is thereby achieved.

These and other features, objects and advantages will be better understood from the following description taken in connection with the accompanying drawing of a preferred embodiment of the invention and wheein:

Figure 1:
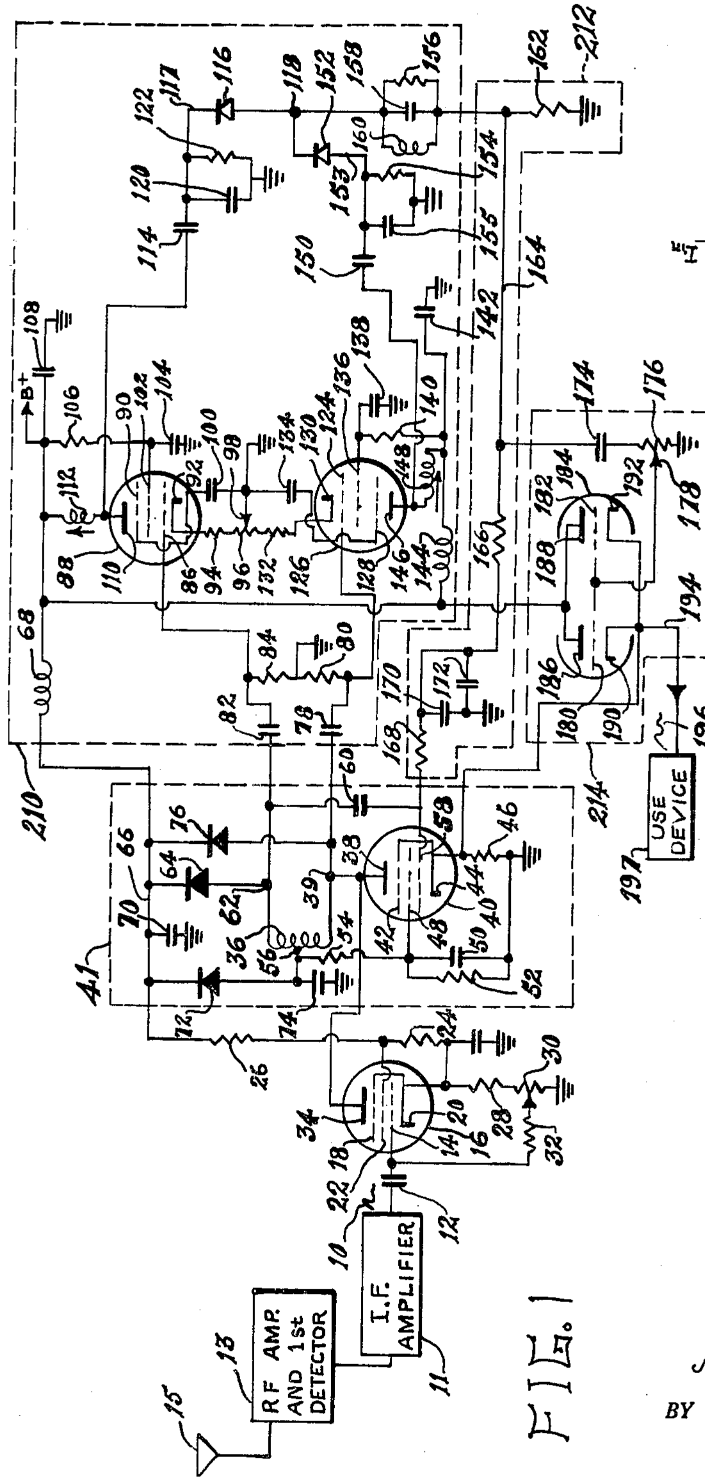
FIG. 1 is a partially block and partially schematic diagram of a signal-to-noise ratio enhancing device made and operated in accordance with the present invention.

Referring more particularly to the signal-to-noise ratio enhancing device shown in FIG. 1, a frequency modulation signal 10 from the output of an intermediate frequency signal amplifier 11, whose input may be coupled to a conventional radio frequency amplifier and first detection circuit 13 fed by an antenna 15, is coupled through coupling capacitor 12 to control grid 14 of a remote cut-off pentode 16. The remote cut-off pentode 16 has a suppressor grid 18 tied back to a cathode 20 and a screen grid 22 coupled to a point between voltage divider resistors 24 and 26. The cathode 20 of the remote cut-off pentode 16 is coupled through a resistor 28 and potentiometer resistor 30 to ground. The center arm of the potentiometer 30 is coupled through a resistor 32 back to the control grid 14. Moving the center arm on the potentiometer resistor 30 changes the bias on the control grid 14 thereby changing the gain of the remote cut-off pentode 16.

The remote cut-off pentode 16 also has a plate 34 coupled to one side of an inductor 36 in a regenerative feedback diode limiter circuit 41. The side 36 is also coupled to a plate 38 of a sharp cut-off pentode 40 having a suppressor grid 42 tied back to a cathode 44 which is coupled through a resistor 46 to ground. The sharp cut-off pentode 40 also has a screen grid 48 coupled through a capacitor 50 and a resistor 52 in parallel to ground and through a resistor 54 to a center tap 56 on the inductor 36. The sharp cut-off pentode 40 also has a control grid 58 coupled through a coupling capacitor 60 to the other side 62 of the inductor 36 and through a zener diode 64 to a line 66 which is connected at one end to B+ through a radio frequency choke 68 and at its other end to the resistor 26. The B+ line 66 is also coupled through a bypass capacitor 70 to ground and through a second zener diode 72 to the center tap 56 on the inductor 36 and through a coupling capacitor 74 to ground. A third zener diode 76 is coupled from the B+ line 66 to the side 39 of the inductor 36 carrying the plate 38.

The side 39 of the inductor 36 is also coupled through a coupling capacitor 78 and a voltage divider resistor 80 to ground. The side 62 of the inductor 36 is coupled through a coupling capacitor 82 and a voltage divider resistor 84 to ground. The side 62 is also coupled through capacitor 82 to a control grid 86 in a wide-band high-gain pentode 88 having a suppressor grid 90 tied back to a cathode 92 which is connected through voltage divider resistor 94, potentiometer resistor 96 and center tap 98 to ground. The cathode 92 is also coupled through a bypass capacitor 100 to ground. The wide-band, high-gain pentode 88 also has a screen grid 102 coupled through a bypass capacitor 104 to ground and through a resistor 106 to B+ which is coupled through a bypass capacitor 108 to ground. The wide-band, high-gain pentode 88 also has a plate 110 coupled through an inductor 112 to B+ and through a coupling capacitor 114 and a diode 116 to a point 118. Line 117 between the capacitor 114 and diode 116 is coupled through parallel bypass capacitor 120 and resistor 122 to ground.

The side 39 of the inductor 36 is also coupled through the coupling capacitor 78 to a control grid 124 of a second high-gain, wide-band pentode 126 having a suppressor grid 128 tied back to a cathode 130. The cathode 130 is coupled through a resistor 132 through the potentiometer 96 and wiper arm 98 to ground. The cathode 130 is also coupled through a bypass capacitor 134 to ground.

The high-gain, wide-band amplifier pentode 126 also has a screen grid 136 coupled through a bypass capacitor 138 to ground and through a resistor 140 and another bypass capacitor 142 to ground.

The screen grid 136 is also coupled through the resistor 140 and a radio frequency choke 144 to B+.

The wide-band, high-gain amplifier 126 also has a plate 146 coupled through an inductor 148 and the bypass capacitor 142 to ground and through a radio frequency choke 144 to B+. The plate 146 is also coupled through a coupling capacitor 150 and diode 152 to the point 118. Line 153 between capacitor 150 and diode 152 is coupled through parallel resistor 154 and bypass capacitor 156 to ground.

Point 118 between the diodes 116 and 152 is coupled through a parallel resonant circuit 154 consisting of resistor 156, capacitor 158 and inductor 160 to one side of the D.C. ground pass return resistor 162, the other side of which is coupled to ground, and through a line 164 carrying series resistors 166 and 168 back to the control grid 58 of the sharp cut-off pentode 40. Two capacitors, one high frequency bypass capacitor 170 and a low frequency bypass capacitor 172 are coupled in parallel from a point on line 164 between the resistors 166 and 168 to ground.

The line 164 is also coupled through a coupling capacitor 174 and a potentiometer resistor 176 to ground. The potentiometer resistor 176 has a wiper arm 178 coupled to control grids 180 and 182 of a dual triode 184 which has the anodes 186 and 188 coupled to B+ and cathodes 190 and 192 coupled to the cathode 44 of the sharp cut-off, high-gain pentode 40. The cathodes 190 and 192 are also coupled to signal output line 194 for carrying the modulation information of the input signal 10 as an output signal 196 to a use device 197, such as a speaker or video signal device.

In the operation of the present signal-to-noise ratio enhancing device illustrated in FIG. 1 the frequency modulation, intermediate frequency signal 10 from the IF amplifier 11, appears through the coupling capacitor 12 at the control grid 14 in the remote cut-off pentode 16. The amplification of this signal by the pentode 16 is controlled by the position of the wiper arm of potentiometer 30. The amplified signal from the pentode 16 is made to appear at the side 39 of the inductor 36 in the regenerative diode limiter circuit 41. Inductor 36 is proportioned with respect to the capacitive constants of the diode limiters 72, 64, and 76 and plate capacitance of the pentodes 40 and 16 to have a natural resonating frequency equal to the center frequency of the intermediate frequency amplifier 11 which is preferably at the center of the IF amplifier passband. By varying the amplification of the signal from the remote cut-off pentode 16, the signal appearing at the side 39 of the inductor 36 can be made thereby to change the pass-band of the regenerative diode limiter circuit 41.

The regenerative diode limiter circuit 41 may be symbolically considered equivalent to the configuration shown in FIG. 2 which may be represented as having a limiter gain G equal to limiter output voltage $E_{out}$ over limiter input signal current $I_{in}$ as follows:

$$G=\frac{E_{out}}{I_{in}}$$

Figure 3:
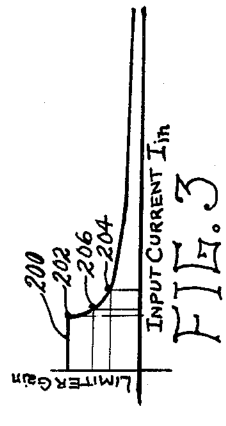
FIG. 3 is a graph of limiter gain versus input signal current for more clearly illustrating operation of the present invention.
Figure 2:
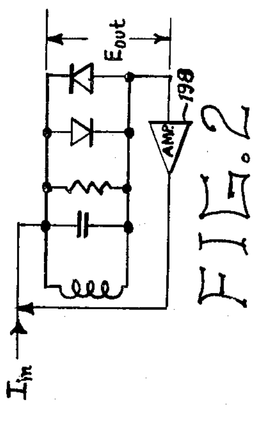
FIG. 2 is a partially block and partially schematic diagram of a symbolic equivalent circuit for more clearly illustrating operation of the invention.

The sharp cut-off pentode 40 is symbolically illustrated as the block diagram amplifier 198 in FIG. 2 and has a gain symbolized as $G_m$. It has been found that oscillation will occur in the regenerative limiter 41 illustrated in FIGS. 1 and 2 when $G_m$ times G reaches unity (represented by the expression $G_m \times G=1$) and will not oscillate when $G_m$ times G is less than unity. The limiter 41 gain characteristic is brought out in the graph of gain G to current $I_{in}$ in FIG. 3 by the curve 200 which shows that, from the point 202 where the diodes 64 and 76 begin to conduct, G becomes a hyperbolic function of the input current $I_{in}$ of the signal 10.

In view of this and the fact that the feedback amplifier 198 gain $G_m$ is constant, the feedback amplifier gain, $G_m$ times the limiter G, automatically adjusts itself to remain at all times unity when no signal 10 is present. When a signal 10 is present as represented by the signal current $I_{in}$ in FIG. 2, the gain G of the two terminal limiter is depressed such as to a point 204 below its normal operating point which is 206. The gain $G_m$ in the amplifier 198 is set so that the normal operating point 206 always lies to the right of the diode conduction or break point 202. The limiter gain G at point 204, when multiplied by the gain $G_m$ of the amplifier 198, results in a loop gain of less than unity, thereby making the circuit at this point non-oscillatory but rather regenerative at the frequency of the incoming signal 10.

Figure 4:
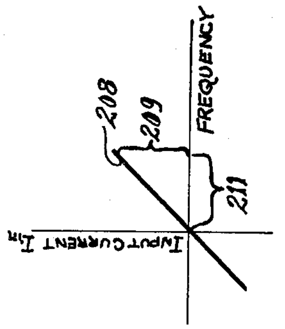
FIG. 4 is a graph of signal current versus lock-on-frequency to more clearly show operation of the invention.

For signals occurring at some other frequency than the center frequency of the incoming signal 10, which is the natural frequency of the regenerative limiter 41, signal current amplitudes $I_{in}$ have to be greater than zero in order to lock the regenerative limiter 41 to the frequency of the incoming signal 10, thus preventing the limiter circuit 41 from regenerating at its own natural frequency. It is found that a natural characteristic of the regenerative limiter circuit 41 is that this locking frequency of the regenerative limiter 41 varies substantially linearly with respect to the intensity of the input signal current $I_{in}$. Therefore, the needed lock-on intensity of the intermediate frequency signal 10 is a linear function of frequency excursion of the signal 10 away from the natural center frequency of the limiter circuit 41. This is shown by the line 208 in FIG. 4 which is a plot of input signal current $I_{in}$ to signal lock-on frequency of the limiter circuit 41. In view of this substantially linear relationship between minimum locking current and lock-on frequency of the limiter circuit 41, it can be seen that a specific current input such as 209 will lock the regenerative limiter 41 over only a specific minimum frequency bandwidth 211. The greater the intensity of signal input current, $I_{in}$, the greater the bandwidth 211. Therefore, the bandwidth 211 can be controlled by the intensity of the input current $I_{in}$ and in the FIG. 1 embodiment is controlled by the position of the wiper arm on the potentiometer resistor 30 which controls the gain of the remote cut-off pentode 16. This gain is set for a value such that a maximum improvement in signal-to-noise ratio is achieved commensurate with the time delay caused by the balance of the circuit including the discriminator 210 and feedback tracking control voltage circuit 214 shown in FIG. 1.

Referring again to FIG. 1 and continuing description of the operation thereof, the amplified signal 10 appears through the remote cut-off amplifier tube 16 as input current $I_{in}$ at the side 39 of the inductor 36. An identical signal, but opposite in phase, appears at the opposite side 62 of the inductor 36 thereby providing proper phase regenerative feedback through coupling capacitor 60 to control grid 58 of the sharp cut-off amplifier 40, thus completing the regenerating feedback loop in the regenerative limiter 41.

The zener diode 72 is selected such that its breakdown voltage is slightly less than that of zener diodes 64 and 76. Therefore, alternating current components of the signal 10 appearing across the inductor 36 will add to the bias voltage developed by the zener diode 72. When the bias voltage across the zener diode 72 plus the signal voltage across the inductor 36 reaches a selected value, the zener diode 64 or 76 will thereupon conduct to cause the amplitude limiting action. Specific desirable characteristics of the zener diode breakdown conduction is that a very high conductance with low capacity variation occurs. Both of these desirable characteritsics contribute to the high performance of the present embodiment.

The signal in the regenerative limiter circuit 41, so limited in amplitude, is fed through coupling capacitors 78 and 82 to control grids 124 and 86 respectively in the high gain, broadband amplifiers 126 and 88 respectively which with associated circuitry form the broadband discriminator or frequency modulation to amplitude modulation converter detector circuit 210.

The voltage developed on the plate 110 of the high gain amplifier 88 is rectified by diode 116 and appears at point 118. The resistor 122 and capacitor 120 form a direct current and a radio frequency bypass ground return path respectively. The capacitor 120, resistor 122 and diode 116 combine to form a frequency modulation to amplitude modulation detector circuit. The frequency modulation to amplitude modulation conversion is accomplished by tuning inductor 112 considerably to the side of the center frequency of the IF amplifier 11 and signal 10.

Diode 152, resistor 154 and capacitor 155 similarly form a frequency modulation to amplitude modulation detector circuits of opposite polarity for the amplifier pentode 126. Also, inductor 148 is tuned to the opposite side of the center frequency of the signal 10, by the same amount as the inductor 112, for providing frequency modulation to amplitude modulation conversion. The two inductors 112 and 148 are adjusted for optimum discriminator linearity and for zero output at the center frequency when observed at point 118.

The parallel resonant circuit consisting of inductor 160, capacitor 158, and resistor 156 impose a high impedance path for radio frequency signals, thus, decoupling any radio frequency from the point 118 of the discriminator output. This prevents such radio frequency signals from appearing through line 164, resistors 166 and 168 at the control grid 58 of the sharp cut-off pentode 40, forming a D.C. stabilization path or loop 212 to maintain the free-running center frequency of the limiter 41, when no signal 10 is present at the desired center frequency which as explained above is preferably the center frequency of the intermediate frequency amplifier 11. The nature of this D.C. feedback loop 212 is to provide a negative type of feedback stabilization to the grid 58, which is self correcting.

The coupling capacitor 174 serves to prevent direct current in the line 164 from appearing across the potentiometer 176. The signal from the wiper arm 178 of the potentiometer 176 is fed to the grids 180 and 182 of the impedance matching cathode follower 184 in a tracking control feedback loop 214. The output of the cathode follower 184 in the tracking control loop 214 has the same phase as the signal appearing at the grids 180 and 182 and is fed to the cathode 44 of the feedback amplifier 40 in the regenerative limiter 41. The purpose of this voltage is to control the position of the center frequency of the passband of the regenerative limiter 41. Thereby, the passband of the regenerative limiter 41 may be adjusted such that its actual value is considerably smaller than that required to encompass the entire passband of the intermediate frequency amplifier 11. This narrow passband of the regenerative limiter 41 is thereby caused to follow or track the signal frequency 10 by voltage fed back through the cathode follower 184 to the cathode 44 of the feedback amplifier 40. This A.C. feedback, because it is fed to the cathode 44, is positive in nature. The absolute value of the feedback voltage is adjusted by the wiper arm 188 on the potentiometer resistor 176. Its value is adjusted to a value wherein the passband of the regenerative limiter 41 just follows and encompasses the instantaneous frequencies of the signal 10.

By way of further explanation of operation, if the sensitivity of the regenerative limiter 41 to center frequency guidance voltage from the negative feedback circuit 212 is represented as N (kilocycles/volt) and the discriminator 210 output sensitivity is represented as K (volts/kilocycle); with no amplification in the stabilization loop 212, any error in the free-running center frequency of the regenerative limiter 41 will be reduced by the factor $$\frac{1}{1+NK}$$

For close control it is desirable to make the factor NK as high as possible.

In the case of the positive or tracking voltage guidance feedback in the tracking control loop 214, an excursion in the input signal 10 frequency by an amount $\Delta F$ should result in a guidance voltage fed back through the tracking control loop 214 of sufficient amplitude to shift the incremental free running frequency of the regenerative limiter by $\Delta f$. A shift in frequency of the signal 10 to the discriminator 210 will result in an output of $\Delta f \cdot K$ volts from the discriminator, which when passed through the amplifier in the feedback circuit 214 results in a voltage to the limiter 41 of $\Delta f \cdot K \cdot G_m$, where $G_m$ is the gain of the amplifier.

The voltage required to shift the center frequency of the regenerative limiter 41 by exactly $\Delta f$ is $\Delta f/N$ with NK being fixed, the exact value of $G_m$ may be found:

$$\Delta f \cdot K \cdot G_m = \frac{\Delta f}{N}$$

$$G_m = \frac{1}{KN}$$

This value of $G_m$ is a fixed parameter, assuming that K and N are linear coefficients and once fixed need not be changed for a particular system configuration, however the precision with which the above equation is obeyed will affect system performance, especially when large values of noise reduction are anticipated.

Another consideration which must be taken into account is the delay encountered around the feedback guidance loop including the discriminator 210 and tracking voltage control feedback circuit 214. Let us designate the total intermediate frequency bandwidth of the IF amplifier 11 as B, and a selected smaller effective bandwidth of the regenerative limiter circuit 41 as $b$ and assume that under conditions of no frequency modulation, the signal carrier resides in the center of the bandwidth $b$. For effective operation of the regenerative limiter 41, the carrier signal must not drift or lag by more than $b/2$ away from the center frequency of the bandwidth $b$. This criterion establishes the maximum permissible delay around the feedback guidance loop and may be mathematically determined as follows:

Let the maximum modulation frequency be $W_M$ and the peak deviation be $\Delta\Omega$, then the signal $E_S$ at the carrier frequency ($W_c$) may be seen to be $$E_S = A \cos (W_c t + \Delta\Omega \sin W_M t)$$

where A is a constant and $t$ is time in seconds.

The term $\Delta\Omega \sin W_M t$ represents the excursions about the carrier frequency due to the modulation, and of interest here is the maximum rate of change of position (in frequency) of the signal which occurs at $$t = \frac{N\pi}{W_M}$$

where $N=0, 1, 2, 3$, etc.

Differentiation yields this velocity as $$V_{max} = W_M \Delta\Omega \text{ rad./sec.}^2$$

If we assume a time delay $t_d$ seconds, then the center frequency of the regenerative limiter 41 will depart from that of the signal by $b_d = t_d W_M \Delta f$ rad./sec.

We have previously stated that the permissible excursion of the regenerative limiter center frequency from that of the signal may not exceed $b/2$, so using this factor in the above equation $$b_d \leq b/2$$

$$b/2 \geq t_d W_M \Delta\Omega$$

and solving for maximum permissible time delay, using the equality $$t_{d_{max.}} = \frac{b}{2 W_M \Delta\Omega}$$

By way of example and not limitation of the order of delay permitted, a typical telemetry system may have the values $$B = 6\pi \times 10^5 \text{ radians/sec.}$$

$$W_M = 14\pi \times 10^4 \text{ radians/sec.}$$

$$\Delta\Omega = 2.5\pi \times 10^5 \text{ radians/sec.}$$

A regenerative limiter bandwidth of $.033B = 2\pi \times 10^4$ radians/sec. will effect a reduction in total noise of about 14 db.

Considering an I.F. frequency of 20 megacycles, a discriminator bandwidth of 5 megacycles, and a feedback video bandwidth of 10 megacycles, the minimum delay encountered would be approximately .03 microseconds, yielding a permissible $b$ of 0.1B, which results in a reduction of noise of approximately 10 db, as a representative example of order of noise reduction by the present invention.

This invention is not limited to the particular details of construction and operation as equivalents will suggest themselves to those skilled in the art.

What is claimed is:

1. For a frequency modulation receiver of the type having an intermediate frequency amplifier for intermediate frequency modulation information signals in an intermediate frequency passband, the combination of a diode amplitude limiter circuit adapted for coupling to the intermediate frequency amplifier in the path of the information signals and having a frequency passband much smaller than the frequency passband of the intermediate frequency amplifier, a regenerative feedback loop in the diode amplitude limiter circuit coupled in manner tending to increase the amplitude of signals in the diode limiter circuit, a discriminator coupled to the diode amplitude limiter circuit for demodulating the frequency modulation information signals, and feedback means coupled to the discriminator and diode amplitude limiter for causing the limiter passband to follow the instantaneous frequency excursions of the information signal.

2. The combination as in claim 1 wherein zener type diodes are used in the diode amplitude limiter circuit.

3. The combination as in claim 1 wherein the regenerative feedback loop includes a linear feedback amplifier.

4. The combination as in claim 1 wherein the discriminator is of an extremely wideband type.

5. For a frequency modulation receiver of the type having intermediate frequency amplifier for intermediate frequency modulation information signals in an intermediate frequency passband, the combination of a diode amplitude limiter circuit adapted for coupling to the intermediate frequency amplifier in the path of the information signals, a regenerative feedback loop in the diode amplitude limiter circuit coupled in manner tending to increase the amplitude of signals in the diode limiter circuit a variable gain preamplifier driver interposed in the path of the frequency modulation information signals to the diode amplitude limiter circuit for amplifying said information signals and thereby reducing the frequency passband of said limiter circuit to a value substantially smaller than the passband of said intermediate frequency amplifier, a discriminator coupled to the diode amplitude limiter circuit for demodulating the frequency modulation information signals, and feedback means coupled to the discriminator and diode amplitude limiter for causing the limiter passband to follow the instantaneous frequency excursions of the information signals.

6. The combination as in claim 2 wherein the variable gain preamplifier driver is a remote cutoff type pentode.

7. For a frequency modulation receiver of the type having an intermediate frequency amplifier for intermediate frequency modulation information signals in an intermediate frequency passband, the combination of a diode amplitude limiter circuit adapted for coupling to the intermediate frequency amplifier in the path of the information signals, a regenerative feedback loop in the diode amplitude limiter circuit coupled in manner tending to increase the amplitude of signals in the diode limiter circuit, a linear feedback amplifier in the regenerative feedback loop, a discriminator coupled to the diode amplitude limiter circuit for demodulating the frequency modulation information signals, a direct current stabilization circuit from the discriminator to the feedback amplifier for stabilizing operation of the limiter circuit, and an alternating current circuit from the discriminator to the feedback amplifier for causing the passband of the limiter to follow the frequency excursions of the frequency modulation information signals.

8. For a frequency modulation receiver of the type having an intermediate frequency amplifier for intermediate frequency modulation information signals in an intermediate frequency passband, the combination of a diode amplitude limiter circuit adapted for coupling to the intermediate frequency amplifier in the path of the information signals and having a passband substantially smaller than the passband of the intermediate frequency amplifier, a regenerative feedback loop including a linear feedback amplifier having a cathode in the diode amplitude limiter circuit coupled in manner tending to increase the amplitude of signals in the diode limiter, a discriminator coupled to the diode amplitude limiter circuit, and an alternating current path from the discriminator to the cathode of the linear feedback amplifier for providing tracking control to the amplitude limiter circuit passband.

9. For a frequency modulation receiver of the type having an intermediate frequency amplifier for intermediate frequency modulation information signals in an intermediate frequency passband, the combination of a diode amplitude limiter circuit adapted for coupling to the intermediate frequency amplifier in the path of the information signals and having a passband substantially smaller than the passband of the intermediate frequency amplifier, a regenerative feedback loop including a sharp cutoff pentode having a control grid and cathode in the diode amplitude limiter circuit coupled in manner tending to increase the amplitude of signals in the diode limiter circuit, a discriminator coupled to the diode amplitude limiter circuitt, a direct current path from the discriminator to the control grid for providing a stabilizing control signal to the amplitude limiter, and an alternating current path from the discriminator to the cathode of the pentode for providing tracking control to the amplitude limiter circuit passband.

10. For a frequency modulation receiver of the type having an intermediate frequency amplifier for intermediate frequency modulation information signals in an intermediate frequency passband, the combination of a diode amplitude limiter circuit having an input and an output sides with the input side adapted for coupling to the intermediate frequency amplifier in the path of the information signals, means in responsive relation to the information signals coupled to the output side of the amplitude limiter circuit for limiting the frequency passband of the limiter to a value much smaller than the frequency passband of the intermediate frequency amplifier, direct current feedback means coupled from the output to the input of the amplitude limiter for maintaining in the absence of an information signal an inherent limiter frequency equal to the center frequency of the intermediate frequency amplifier, and alternating current feedback means coupled from the output side to the input side of the amplitude limiter for causing the limiter passband to track information signals reaching the amplitude limiter.

11. In a regenerative type diode amplitude limiter circuit for enhancing radio frequency signals passing therethrough, the combination of a signal receiving inductor having two ends and a centertap, a conductor for coupling to a direct current power source, a pair of zener diodes, one coupled from one end of the inductor to the conductor and the other coupled from the other end of the inductor to the conductor, and a feedback loop including a linear amplifier stage having an anode and control grid, with the control grid coupled to said one end and the anode to said other end of the inductor for thereby feeding the signal output of said limiter circuit back to said inductor.

12. In combination in a signal enhancing device a signal receiving inductor having two ends and a centertap, a conductor for coupling to a direct current power source, a pair of zener diodes, one coupled from one end of the inductor to the conductor and the other coupled from the other end of the inductor to the conductor, a third zener diode coupled from the centertap to the conductor, a feedback loop including a linear amplifier stage having an anode, cathode and control grid with the control grid coupled to said one end and the anode to said other end of the inductor, and a broadband discriminator across the inductor for demodulating the signal output from said inductor and having a demodulation signal and direct current output conductors, the direct current output conductor of said discriminator coupled to the control grid and the demodulation signal conductor coupled to the cathode of said linear amplifier.

13. For an intermediate frequency modulation information signal, an amplitude limiter circuit including an inductor and a pair of zener diodes across the inductor and a regenerative feedback circuit with a linear feedback amplifier coupled across the inductor, the amplitude limiter including a remote cutoff amplifier means interposed in the path of the frequency modulation information signal to the amplitude limiter for limiting the frequency passband of the amplitude limiter, and discriminator feedback means coupled to the limiter and linear amplifier for providing tracking control of said limiter passband.

References Cited by the Examiner

UNITED STATES PATENTS

| | | | |
|---|---|---|---|
| 2,351,193 | 6/44 | Crosby | 325—349 |
| 2,395,738 | 2/46 | Hanson et al. | 325—427 |
| 2,488,359 | 11/49 | Wheeler | 325—344 |
| 2,947,859 | 8/60 | MacDonald | 325—427 |

DAVID G. REDINBAUGH, *Primary Examiner.*